Figure 1:
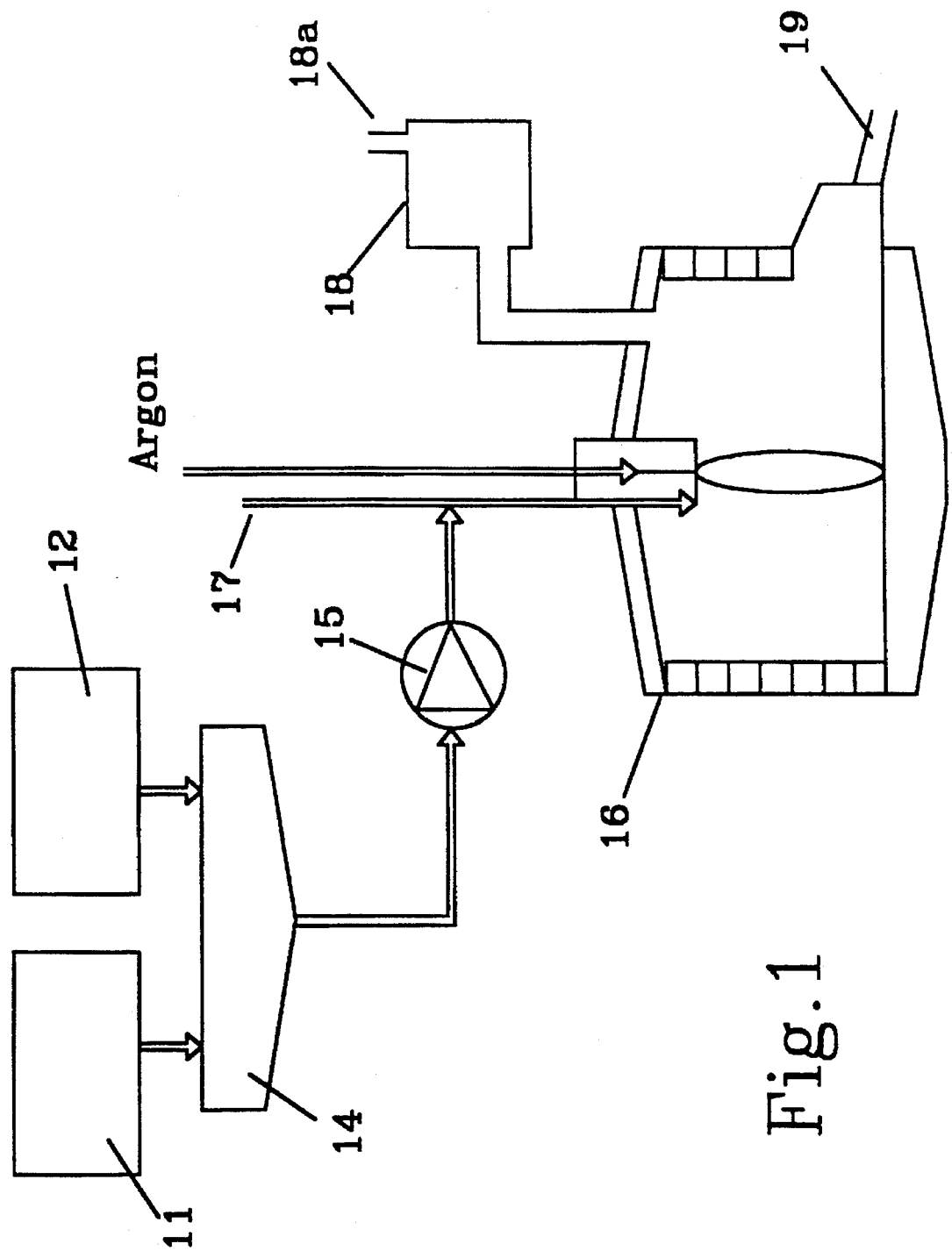

United States Patent [19]

Sörvik

[11] Patent Number: 5,653,182
[45] Date of Patent: Aug. 5, 1997

[54] METHOD FOR NEUTRALIZING WASTE

[75] Inventor: Arvid Inge Sörvik, Kopperaa, Norway

[73] Assignee: HAS Holding AS, Trondheim, Norway

[21] Appl. No.: 530,372

[22] PCT Filed: Mar. 25, 1994

[86] PCT No.: PCT/NO94/00068

§ 371 Date: Dec. 28, 1995

§ 102(e) Date: Dec. 28, 1995

[87] PCT Pub. No.: WO94/23856

PCT Pub. Date: Oct. 27, 1994

[30] Foreign Application Priority Data

Apr. 15, 1993 [NO] Norway ................ 931382

[51] Int. Cl.$^6$ .................... F23G 5/00
[52] U.S. Cl. ............ 110/250; 110/345; 110/346; 75/434; 75/958
[58] Field of Search ................ 110/210, 216, 110/235, 259, 345, 346; 75/434, 958, 959, 961

[56] References Cited

FOREIGN PATENT DOCUMENTS

| 4131974 | 4/1993 | Germany . |
| 4313615 | 11/1992 | Japan . |

*Primary Examiner*—Henry A. Bennett
*Assistant Examiner*—Pamela A. O'Connor
*Attorney, Agent, or Firm*—Dennison, Meserole, Pollack & Scheiner

[57] ABSTRACT

Method for neutralizing waste, such as powder from luminescent tubes and similarly, residue from incineration of household waste, optionally comprising environmentally hazardous components, such as Hg, Cd, Zn, Co or Ba. The waste is fed into a melting furnace in conjunction with an $SiO_2$-rich material, and a reducing agent, and in a first optional step, the furnace is operated at reducing conditions and at a temperature effecting reduction of heavy metals and any other compounds in the raw material, whereby the reduced heavy metal and other components are withdrawn from the furnace with the exhaust gas and are separated from the same, and in a second step the furnace is operated at oxidizing conditions and at a temperature ensuring oxidation of remaining elements in the slag present in the furnace from said first step, whereby the slag becomes, at least gradually, of low viscosity, and the molten slag is drained from the furnace and solidified, optionally die casted and/or water granulated, thus forming inert glassified slag.

11 Claims, 2 Drawing Sheets

METHOD FOR NEUTRALIZING WASTE

The present invention concerns a method for neutralizing waste, such as fly ash from combustion of house refuse, fluorescent tubes and similar.

BACKGROUND

At the present, there is a high demand to manage environmetally harmful waste in general, and in particular fly ash from combustion of waste and fluorescent tubes. Combustion of e.g. house refuse results in residual materials such as slag and fly ash which contain mercury and heavy metals, such as barium, cadmium, cobolt and chrome, in addition to large quantities of mercury and lead. These materials are considered as hazardous waste in Norway and in the most of the European countries. During the destruction of fluorescent tubes, the powdery fluorescent material therein is separated from the metal, plastic and glass components including mercury. This powder, comprising about 38–40 different elements, is also characterized as hazardous waste in most of the European countries. At the present there is no satisfactory or environmetally safe method to handle such waste, and one has to resort to deposits in special waste storage.

NO Patent 172103 describes a method for treating waste material. According to this process, solid and/or liquid waste is/are combined with a binder material, in this case clay, whereupon the granulated/powdery mixture is subjected to pyrolysis to remove volatile components in the waste. The waste is then fed to a furnace at oxidizing conditions to oxidize remaining volatile components and at least some of the bound carbon, whereupon the waste is passed through a vitrification process to form a solid aggregate.

However, the above process is different from the present in several ways, as the heat treatment is applied to the waste in its solid form. The resultant aggregate will be at least partly porous as a result of the stripping of volatile compounds and carbon. This will allow for water penetration which will result in leaching of environmetally hazardous compounds and elements. The waste treated in accordance with the method of NO Patent 172103 can for that reason not be stored on e.g. waste disposal sites or recovered as recyclable raw materials or products because of the risk of releasing environmetally hazardous components from e.g. water draining from waste disposal sites.

OBJECT

Accordingly, the object of the present invention is to provide a method that permits an environmetally sound treatment of waste, such as ash from refuse incineration (fly ash), and luminescent tubes into a material that can be stored as harmless refuse or recovered as raw material for use in new products, without risk of releasing hazardous components to the environment.

THE INVENTION

The object stated above is fulfilled with a method according to the characterizing part of claim 1. Further beneficial features appear from the accompanying claims.

According to the present invention, waste such as fly ash from refuse incineration, coating from TV screens and similar, and luminescent powder from luminescent tubes, luminescent lamps and similar, is neutralized by embedding the waste in glassified slag, optionally with the removal of heavy metal components.

In more detail, the neutralization occurs by charging, in a first step, waste, such as fly ash from refuse incineration, including $SiO_2$-containing material and optionally carbon containing material into a furnace operated at reducing conditions, whereupon compounds of mercury, lead, zinc, cadmium and any other elements are reduced and withdrawn from the furnace along with the exhaust gases.

This first step of reducing heavy metals is, however, not required if: 1) heavy metal compounds/elements are absent in the refuse to be treated, or 2) the neutralized waste is to be left permanently on a waste disposal site and not to be used as recyclable raw material. One example of waste that belongs to category 1) above is waste from luminescent tubes and similar products.

The reduced components escaping with the exhaust gases from the furnace are transformed to oxides in a combustion chamber and separated from the exhaust gases, by e.g. a filtering after cooling of the exhaust gas. This filter dust, which substantially comprises oxides of mercury, zinc, lead and some cadmium oxide, is neutralized separately in further processing by embedding the filter dust in a glassified silicate slag. Particularly, the filter dust and $SiO_2$-containing material, such as scrap glass, are fed either separately, or as a mixture into a plasma furnace or another suitable electrical melting furnace operated at oxidizing conditions and at a temperature at which the slag becomes fluid, whereupon the fluid oxidized slag is cooled down and, if desired, moulded or granulated in water to form glassified slag, which is resistent to leaching at ambient conditions. The slag can then be stored without any risk of the metal oxides being released to the environment. However, such slag is not particularly suitable as raw material in the production of e.g. foamed glass.

In a second step, after completion of the optional reduction and stripping of the metals mentioned above, the operational conditions of the furnace are changed from reduction to oxidation to ensure that the residual material is present as oxides in a slag material. The oxidized residue material from the first step, optionally the raw material corresponding to the material fed to step 1, is then heated to a temperature which renders the material into a fluid state, whereupon the liquid slag is withdrawn from the furnace and, if desired, moulded in a die or granulated in water. The slag thus obtained, hereinafter denoted as glassified slag, exhibits a glassy consistence without porosity, in which a glassy surface establishes a boundary layer between the interior of the material and the environment. In this way, the components embedded therein can not escape to the environment at ambient conditions (such as during storage at an ordinary waste disposal site).

The resulting glassified slag can, as mentioned above, be stored on a disposal site or reused as raw material in new products. A particularly suitable and preferred use of the glassified slag is as raw material in conjunction with e.g. recycled glass for the production of insulation material of the foamed glass type. Release of hazardous materials from the slag component will not occur in e.g. humid environments, and even in case of fire or exposure to extremely high temperatures, the glassified slag produced in accordance with the present invention will, in the worst case, melt and form an inert mass or agglomerate without release of hazardous components. Accordingly, the glassified slag can also be used in insulation material for use in e.g. domestic buildings. However, in such applications, the slag should have a minimum content of heavy metal oxides, whereby the raw material used should have a small content of such oxides, or the raw material must be subjected to a preliminary reduction, as stated above.

The selection of the particular $SiO_2$-rich material is not critical, and examples of such are silicate dust from production of FeSi/Si, silversand and fines from quartz crushing.

In the optional step, the reducing conditions can be established by supplying at least one reducing agent in any physical state, such as a reducing gas in the form of CO or a mixture of CO and $CO_2$, carbon or other solid carbonaceous materials, such as fines from charcoal and metallurgical coke, or a combination thereof. For example, a solid reducing agent can be charged together with the waste material to be treated and $SiO_2$-rich material, in an inert atmosphere furnace, e.g. nitrogen. The reducing agent can be either supplied separately or with the mixture to be reduced, e.g. by injecting a powdery mixture of waste and $SiO_2$-rich material into a gas flow comprising CO. In a preferred embodiment, the furnace is supplied with a powdery mixture of waste material, $SiO_2$-rich material and a carbonaceous material in a gaseous carrier comprising CO and $CO_2$, and, if desired, combined with a separate supply of $CO/CO_2$. The reducing agents should be present in at least a stochiometric amount.

The oxidizing conditions in the second step can be established by supplying a gaseous oxidant. Naturally, from an economic point of view, air is the preferred oxidant, but hydrogen-containing gases and other oxygen-containing gases can also be used.

The mass ratio between waste, such as fly ash from the combustion of domestic refuse, and the $SiO_2$-rich material is selected so that the basicity of the glassified slag becomes 0.7 or less. In this connection, the basicity is defined as:

$$(\% CaO + 1.39 \cdot \% MgO + 0.54 \cdot \% SrO + 0.37 \cdot \% BaO)/(\% SiO_2)$$

where the weight percent is based on the final weight of the resultant glassified slag. Provided that the percentile of the respective oxides in the respective initial materials (fly ash and $SiO_2$-rich material) are known, the mutual mass ratio between fly ash and $SiO_2$-rich material will readily follow as the total mass of each oxide in a given mass of glassified slag corresponds to approximately the sum of the oxide mass in the mass of fly ash and $SiO_2$-rich material, respectively,— i.e. the mass required to produce the given mass of glassified slag.

Should the proportion of mixture with respect to fly ash and $SiO_2$-rich material be altered in such manner that the basicity exceeds the preferred value of maximum 0.7, the risk for leaching and release of environmentally hazardous elements out of the glassified slag to the environment can be expected to increase. This will of course depend on the conditions to which the glassified slag is subjected, and the maximum limit of 0.7 should be interpreted as instructive rather than definitive.

In order to achieve the maximum possible reduction of the charge—and oxidation—the raw material is preferably provided in a finely divided form, e.g. as powder or as pellets, in which the waste material is preferably mixed homogenously in the $SiO_2$-rich material (optionally mixed with a finely divided solid reducing gent), and the charging should for the same reason be carried out gradually, e.g. during a period of 20 minutes. The reducing conditions are established by maintaining a furnace temperature of at least 1200° C. and supplying reducing agents in at least a stochiometric amount. The first step—the reduction step—is controlled by monitoring the content of metal fume in the exhaust gas. The second step—the oxidation step—is most conveniently controlled with reference to empirical data based on measurements of any un-oxidized metals in the final glassified slag compared with oxidation time and oxygen concentration. In other words, the quantity of available oxidant or the duration of the oxidation must be increased to reduce the portion of un-oxidized residue metal to a minimum.

When the last process step is complete, it is important to ensure that the slag is of a fluid or flowable state. If not, powdery material may increase the risk for release of hazardous components from the glassified slag produced in accordance with the present invention.

In the following description of the process, reference is made to the drawings, in which similar numeral references are used for similar components/process steps.

Figure 2:
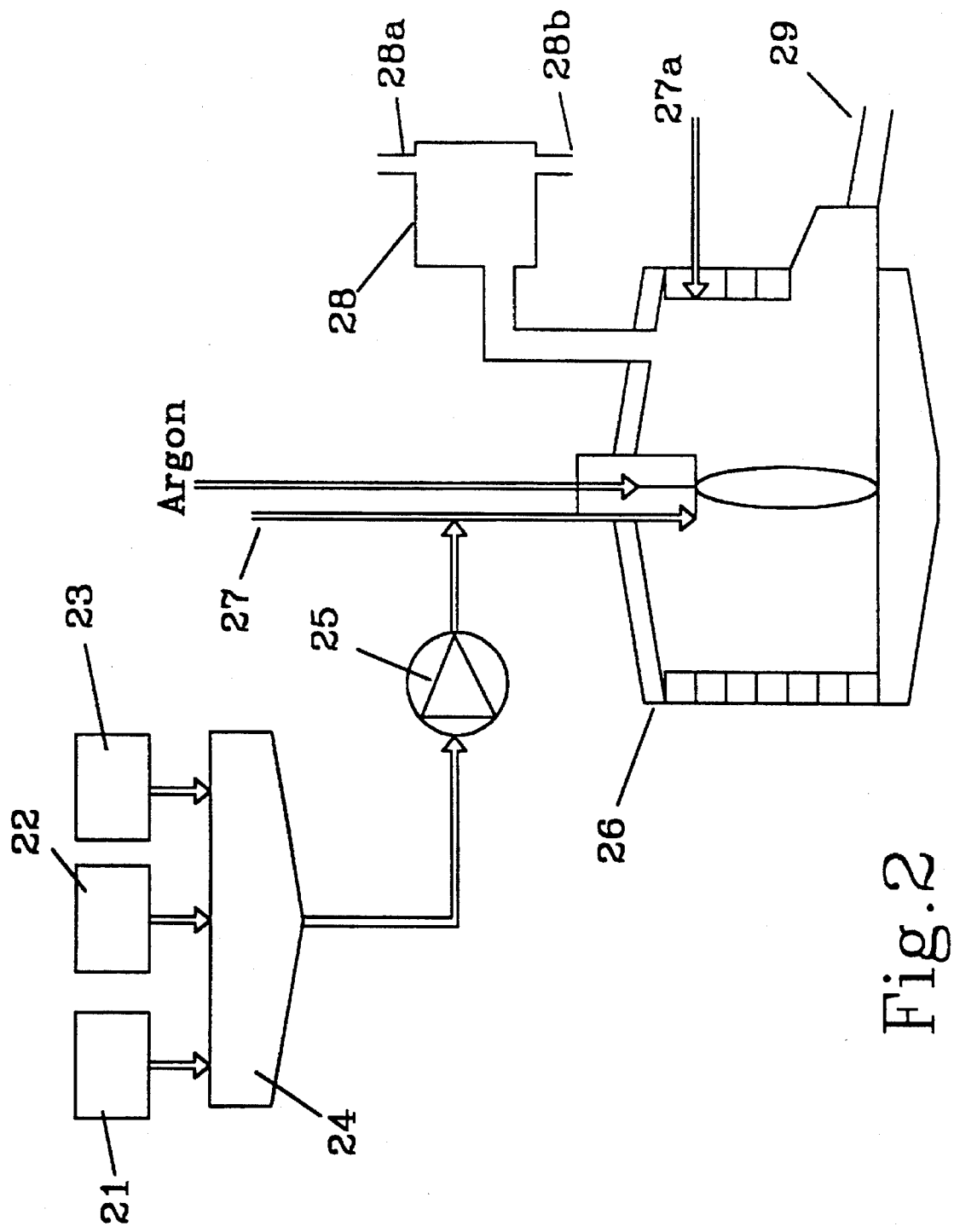

FIG. 1 is a schematic process flow sheet of one example of a first alternative embodiment for neutralizing waste in accordance with the present invention, and FIG. 2 is a schematic process flow sheet, similar to FIG. 1, of an example of another alternative embodiment according to the method for neutralizing waste, the waste containing heavy metal to be extracted in order to use the resulting glassified slag as raw material in new products, e.g. foamed glass for use as insulation material.

Referring to FIG. 1, waste 11, such as powder from luminescent tubes, and silica dust 12 is fed to a mixing unit 14 to form a substantially homogenous mixture. The resulting mixture is fed continously by means of a suitable feed apparatus 15, e.g. a screw conveyor or lock feed, from said mixing unit 14 into a oxygen containing gas flow 17, whereby the mixture comprising gas and solid material is blown into a closed furnace 16, heated with e.g. a plasma burner to a temperature in the range from 1200°–1600° C. The furnace power supply can be maintained at a substantially constant level throughout the process, and the gas supply 17 is maintained for a certain period of time after loading of the solid materials 11 and 12 to ensure complete oxidation. After oxidation is complete, the fluid slag 19 is drawn from the furnace, and, if desired, moulded or granlulated in water (not illustrated). The exhaust gases escaping from the furnace 16 should be filtered in a filter 18, whereby the filtered gas 18a can be liberated to the environment.

Referring to FIG. 2, waste 21, e.g. fly ash from an incinerator plant for household waste, together with carbon 23 as a solid reducing agent, and silica dust 22, is supplied to a mixing unit 24, thus forming a substantially homogenous mechanical mixture. This mixture is fed continously by means of a suitable feed apparatus 25, such as a screw conveyor or lock feed from the mixing unit 24 into a gas flow 27 comprising $CO/CO_2$, whereby the mixture of gas and solid material is blown into a closed furnace 26, heated by e.g. a plasma burner to a temperature of 1200°–1600° C. The furnace power supply can be maintained at a substantially constant level throughout the process. The furnace is supplied with a separate feed 27a of $CO/CO_2$ gas to provide a sufficient amount of reducing gas in the furnace 26. After the desired amount of materials from the mixing unit 24 has been loaded into the furnace, and Zn, Hg, Pb and Co are reduced by means of the reducing agents ($CO/CO_2$ gas and carbon), the supply of $CO/CO_2$ gas is terminated, whereupon the furnace is supplied with a continous flow 27 of air or oxygen. The reduced components in the form of Hg, Zn, Pb and possibly Co are removed from the furnace 26 together with the exhaust gases and separated from the latter in a filter 28, whereupon the filtered exhaust gas 28a is practically free from hazardous components. The reduced and separated metal components 28b examplified above are, as described above, isolated and neutralized as required. The time necessary to reduce the hazardous components in question will naturally depend on the composition fed to the furnace and the furnace operating conditions, but typically the treatment will last about 30 minutes from the initial charging of the furnace. The charge consistency in the first step will be a mixture of solid and fluid material.

At the end of the charging of cold material, the furnace temperature will rise to 1400°–1600° C., whereby the slag is substantially homogenous and of relatively low viscosity. The oxidizing conditions in the furnace are maintained for sufficient time achieve a substantially complete oxidation of the slag. The duration of the oxidation will, similar to the reduction, be dependent on, among other things, the oxygen concentration and the amount of metal to be oxidized, but typically the oxidation cycle lasts about 20 minutes from the alternation to oxidixing atmosphere. The required oxidation period can be found experimentally for the individual process, e.g. by comparing the portion of un-oxidized residue metal in the flag and duration of oxidation and oxygen concentration.

The fluid residue material 29 (slag) is then drawn from the furnace and can, if desired, be subjected to a post treatment (not illustrated), e.g. by die casting or granulation in water, thereby forming discontinuous glassified slag. The total processing time per batch will typically be about 50–60 minutes if the furnace has been preheated. Using a furnace power supply of 1 MW, about 1 ton material can be treated per hour.

EXAMPLE 1

Leaching tests were carried out with fly ash from incineration of household waste, the fly ash, having a content of trace elements as stated in Table 1 below, having been treated in accordance with the present method to glassified slag. Two parallel samples were made, denoted as trial no. 1 and 2 in Table 2 below, in which the sample for trial no. 1 was prepared by mixing 0.5 kg fly ash and 0.8 kg crushed scrap glass, and the sample for trial no. 2 was prepared by mixing 0.5 kg fly ash and 1.0 kg crushed scrap glass. The respective sample mixtures were heated in an induction furnace having an air atmosphere, and moulding temperature (in a cuprous die) of about 1200° C. The resultant samples of glassified slag both exhibited a basicity, as defined above, of about 0.5.

TABLE 1

Portion of trace elements in fly ash from incineration of household waste.

| Element | Amount (mg/kg dry material) | Element | Amount (mg/kg dry material) |
| --- | --- | --- | --- |
| As | 3–140 | Mo | 15–60 |
| Ba | 190–2300 | Ni | 20–200 |
| Pb | 640–3700 | Sr | 150–550 |
| Cd | 10–270 | Sn | <100–810 |
| Co | <10–40 | Th | 80–250 |
| Cu | 300–5000 | V | <20–110 |
| Cr | 140–2400 | W | <20–90 |
| Hg | 2–40 | Zn | 2500–21200 |

The glassified slag provided in accordance with the invention was subjected to a standard leaching test EPA-TCLP, by using a leachant comprising a mixture of acetic acid and NaOH, in two samples. The leachant from each sample was analyzed with an atomic emission spectroscopy (ICP-AES). In addition, the conductivity and pH of the solution was measured.

The chemical composition of the two leachant solutions are shown in Table 2 below.

TABLE 2

Chemical analysis and other properties of the leachants after stability testing.

| Element | Trial no. 1 (mg/l) | Trial no. 2 (mg/l) |
| --- | --- | --- |
| Ag | <0.05* | <0.05 |
| As | <0.1 | <0.1 |
| B | <0.2 | <0.2 |
| Ba | <0.01 | <0.01 |
| Cd | <0.03 | <0.03 |
| Co | <0.02 | <0.02 |
| Cr | <0.02 | <0.02 |
| Cu | 0.069 | 0.045 |
| Li | <0.04 | <0.04 |
| Mo | <0.05 | <0.05 |
| Ni | <0.05 | <0.05 |
| Pb | <0.05 | <0.05 |
| Sb | <0.2 | <0.2 |
| Sn | <0.2 | <0.2 |
| Sr | 0.005 | 0.006 |
| V | <0.05 | <0.05 |
| Zn | 0.23 | 0.11 |
| Electrical conductivity mS/cm | 4.28 | 4.31 |
| pH | 5.00 | 4.97 |

*equal to or less than detection limit.

As appears from the table, the concentration of most of the elements are below the detection limit of the analysis method. Accordingly, the concentration of these elements can even be lower that the values given in the table. The results from these leaching tests illustrates that water drained from a mass of glassified slag exhibits tap water quality. Accordingly, the glassified slag produced in accordance with the present invention is highly stable with respect to leaching of the immobilized compounds/elements.

EXAMPLE 2

Leaching tests were carried out with stabilized powdery waste from luminescent tubes, the powdery waste having a content of trace elements as stated in Table 3 below, having been treated in accordance with the present method to glassified slag, without using the reduction step. Three parallel samples were made, denoted as trial no. 4, 5 and 6 in Table 4 below, in which the sample for trial no. 4 was prepared by mixing 1 kg dust and 2 kg crushed scrap glass, the sample for trial no. 5 was prepared by mixing 1 kg dust and 2 kg crushed scrap glass, and the sample for trial no. 6 was prepared by mixing 0.58 kg dust, 0.3 kg crashed glass and 1 kg silversand. The respective sample mixtures were heated in an induction furnace having an air atmosphere, and moulding temperature (in a cuprous die) of about 1200° C. The resultant samples 4, 5 and 6 exhibited a basicity, as defined above, of about 0.6, 0.7 and 0.49, respectively.

TABLE 3

Composition of powder fom luminescent tubes before stabilization to glassified slag in accordance with the present invention.

| Compound | Amount (wt %) |
| --- | --- |
| SrO | 53 |
| BaO | 31 |
| $ZrO_2$ | 6.3 |
| $As_2O_3$ | 3.1 |
| CdO | 1.9 |
| ZnO | 1.9 |

TABLE 3-continued

Composition of powder fom luminescent tubes before stabilization to glassified slag in accordance with the present invention.

| Compound | Amount (wt %) |
| --- | --- |
| $WO_3$ | 1.3 |
| PbO | 0.7 |
| $SnO_2$ | 0.7 |

The glassified slag provided in accordance with the invention was subjected to a standard leaching test EPA-TCLP, by using a leachant comprising a mixture of acetic acid and NaOH. The leachant was analyzed using atomic emission spectroscopy (ICP-AES). In addition, conductivity and pH of the solution was measured.

The chemical composition of the liquid from each of the leaching tests is shown in Table 4 below.

TABLE 4

Chemical analysis and other properties of leachant after stability tests

| Element | Trial no. 4 (mg/l) | Trial no. 5 (mg/l) | Trial no. 6 (mg/l) |
| --- | --- | --- | --- |
| Ag | <0.05* | <0.05* | <0.05 |
| As | <0.1 | <0.1 | <0.1 |
| B | <0.2 | <0.2 | <0.2 |
| Ba | <0.026 | <0.068 | 0.028 |
| Cd | <0.03 | <0.03 | <0.03 |
| Co | <0.02 | <0.02 | <0.02 |
| Cr | <0.02 | <0.02 | <0.02 |
| Cu | 0.036 | <0.02 | 0.026 |
| Li | <0.04 | <0.04 | <0.04 |
| Mo | <0.05 | <0.05 | <0.05 |
| Ni | <0.05 | <0.05 | <0.05 |
| Pb | <0.05 | <0.05 | <0.05 |
| Sb | <0.2 | <0.2 | <0.2 |
| Sn | <0.2 | <0.2 | <0.2 |
| Sr | 0.018 | 0.043 | 0.019 |
| V | <0.05 | <0.05 | <0.05 |
| Zn | <0.05 | <0.05 | <0.05 |
| Electr. cond. mS/cm | 4.27 | 4.34 | 4.36 |
| pH | 4.92 | 4.92 | 4.95 |

*equal to or less than detection limit.

As appears fom the analytical results above, the glassified slag produced in accordance with the present invention is higly stable and can be disposed of on a conventional waste disposal site, or can even be used as recycled material in new products.

I claim:

1. Method for neutralizing waste, and residue from incineration of waste comprising environmentally hazardous components, comprising the steps of:

charging said waste into a closed plasma furnace or other electrical melting furnace in conjunction with a $SiO_2$-rich material, optionally supplying a reducing agent to the furnace and operating said furnace under reducing conditions at a temperature of from 1200° to 1600° C. to effect reduction of heavy metals and any other compounds in the waste, whereby the reduced heavy metals and other compounds are withdrawn the furnace with exhaust gas and separated from therefrom, operating the furnace under oxidizing conditions at a temperature of from 1200° to 1600° C. to ensure oxidation of remaining elements in the slag present in the furnace, whereby the slag becomes molten, and simultaneously withdrawing exhaust gases from the furnace, and draining and solidifying said molten slag from the furnace, and optionally die casting and/or water granulating the slag, thus forming inert glassified slag.

2. The method of claim 1, wherein the reducing agent is a continuous supply of $CO/CO_2$ gas.

3. The method of claim 1, wherein the reducing agent is a solid carbonaceous reducing agent.

4. The method of claim 1, wherein solid carbon is the reducing agent under an inert furnace atmosphere.

5. The method of claim 1, wherein the oxidizing conditions are supplied by air or another oxygen-containing gas.

6. The method of claim 1, wherein the $SiO_2$-rich material is selected from the group consisting of scrap glass, silicate dust from production of FeSi/Si, silversand, fines from quartz crushing and mixtures thereof.

7. The method of claim 1, wherein said waste, said $SiO_2$-rich material, and optionally solid reducing agent, are charged into said furnace as a substantially homogenous mechanical mixture, in a gas carrier comprising $CO/CO_2$.

8. The method of claim 1, additionally comprising separating said reduced heavy metals and other compounds from the furnace exhaust gas by filtration, mixing the reduced heavy metals and other compounds with $SiO_2$-rich material and oxidizing the mixture in the furnace to form glassified slag.

9. The method of claim 1, additionally comprising using the glassified slag to produce foamed glass.

10. The method of claim 1, wherein the environmentally hazardous components are selected from the group consisting of Hg, Cd, Zn, Co, Pb, Ba and mixtures thereof.

11. The method of claim 1, wherein the waste and $SiO_2$-rich material are charged into the furnace in a ratio to effect a basicity in the glassified slag defined as, in % by weight:

$$(\% CaO + 1.39 \cdot \% MgO + 0.54 \cdot \% SrO + 0.37 \cdot \% BaO)/(\% SiO_2)$$

of 0.7 or less.

* * * * *